Patented July 25, 1950

2,516,251

UNITED STATES PATENT OFFICE 2,516,251

PENILLOIC ACID AND PREPARATION THEREOF

Robert L. Peck, Plainfield, N. J., and Oscar Johnson, Medina, N. Y., assignors to Merck & Co., Inc., Rahway, N. J., a corporation of New Jersey No Drawing. Application December 31, 1946, Serial No. 719,620

8 Claims. (Cl. 260—302)

This invention is concerned with novel stereoisomers of penilloic acid G and processes for preparing the same; more particularly it relates to d-α-penilloic acid G and d-β-penilloic acid G and with processes for preparing these stereoisomers from readily available starting materials. These novel stereoisomeric compounds are important intermediates in the synthesis of penicillin and are useful for the production of other substances having antibiotic activity. They are also of value as a means of establishing the structure of the penicillins and other organic compounds.

It has been determined that these dextrorotatory G-penilloic acids are stereoisomers of the chemical compound, 5,5-dimethyl-2-phenylacetamidomethyl-4-carboxy-thiazolidine, having the empirical formula $C_{15}H_{20}N_2O_3S$, and the structural formula:

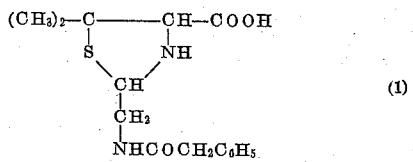

Applicants have discovered that d-α-penilloic acid G, and d-β-penilloic acid G, both stereoisomers of Compound 1 above, can be prepared by reacting d-penicillamine hydrochloride (Compound 2, below) with phenylacetamido-acetaldehyde dibutyl acetal (Compound 3). This reaction may be chemically represented as follows:

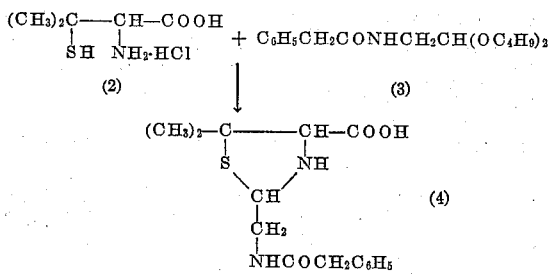

The d-penicillamine hydrochloride starting material (1), employed in applicant's novel and improved process can be prepared by reacting α-amino-β-alkoxy-isovaleric acid with acetic anhydride and triethylamine, removing the solvents, dissolving the 2-alkyl-4-isopropylidene-5(4)-oxazolone thus formed in methanol and reacting with a solution of sodium in methanol saturated with hydrogen sulfide to form N-acetyl-dl-penicillamine and converting this compound to dl-penicillamine hydrochloride by reacting with hydrochloric acid; the racemic penicillamine thus obtained is resolved into its stereoisomers by reacting the racemic compound with formic acid to form N-formyl-dl-penicillamine and reacting the racemic formyl derivative with brucine under conditions such that the N-formyl-d-penicillamine brucine salt is precipitated; this N-formyl-d-penicillamine brucine salt is then treated with aqueous sodium hydroxide to remove brucine, and the product is treated with aqueous hydrochloric acid thereby hydrolyzing the formyl group to produce d-penicillamine hydrochloride. The details of the foregoing procedure are described in the copending application of applicants' assignee, Serial No. 656,513, filed March 22, 1946. The phenyl-acetamido-acetaldehyde dibutyl acetal can be prepared by a conventional acylating procedure involving reaction of phenylacetyl chloride with aminoacetaldehyde dibutyl acetal in the presence of aqueous sodium hydroxide. This procedure, as applied to the preparation of phenylacetamido-acetaldehyde diethyl acetal, is disclosed on page 3 of the "British Reports on Penicillin," September 23, 1944, Br. 106; and the compound phenylacetamido-acetaldehyde dibutyl acetal is disclosed as a reactant on page 3 of the "Merck Report" XIIa, February 29, 1944.

Applicants ordinarily prepare these dextrorotatory stereoisomers of G-penilloic acid by heating a mixture of d-penicillamine hydrochloride and phenylacetamido-acetaldehyde dibutyl acetal, in the presence of an aqueous media. An aqueous solution of penicillamine hydrochloride is acidic in reaction. When phenylacetamido-acetaldehyde dibutyl acetal is heated in said aqueous acidic penicillamine solution, the acetal linkages are hydrolyzed, and the phenylacetamido-acetaldehyde thus formed reacts with the penicillamine to produce d-penilloic acid G.

The reaction is conveniently carried out by mixing an aqueous solution of d-penicillamine hydrochloride with an alcoholic solution of phenylacetamido-acetaldehyde dibutyl acetal. If desired, d-penicillamine can be employed instead of its hydrochloride, but in this case the pH should be adjusted so that the aqueous reaction solution is acidic in reaction. Phenyl-acetamido-acetaldehyde can be used in place of its acetal. When this is done it is not essential to employ acidic reaction conditions since the reaction to form the 5,5-dimethyl-2-phenylacetamidomethyl-4-carboxy-thiazolidine takes place over a wide pH range, that is, between about pH 3 and pH 10, although a pH of approximately 4 is preferred.

The preferred alcohol solvents utilized in the alcoholic solution of phenylacetamido-acetaldehyde dibutyl acetal are the lower aliphatic alcohols, such as ethanol, methanol, propanol, and the like. When penicillamine hydrochloride is employed, the pH of the reaction mixture is conveniently adjusted to the preferred pH of about 4 by the addition of an alkali metal acetate, such as sodium acetate, potassium acetate, and the like.

The reaction may be carried out at room temperature, or if desired, at elevated temperature, as for example, by heating the reaction mixture on a steam bath. When a temperature of the order of 80–100° C. is employed, the reaction is substantially complete in a few minutes. A preferred method of carrying out the reaction is to heat the aqueous acidic solution containing penicillamine hydrochloride and phenylacetamido-acetaldehyde dibutyl acetal whereby the hydrolysis of the acetal is effected rapidly and substantially quantitatively. This solution is then cooled and the pH adjusted to about 4 by adding an alkali acetate. This solution is then allowed to stand at room temperature or heated, if desired, to complete the formation of the desired 5,5-dimethyl-2-phenylacetamidomethyl-4-carboxy-thiazolidine.

This compound can be separated from the inorganic constituents by evaporating the reaction solution to dryness and dissolving the residue in a substantially anhydrous lower aliphatic alcohol solvent. The insoluble sodium chloride is removed by filtration and the resulting solution can then be evaporated to dryness to produce a mixture of the dextrorotatory stereoisomers of 5,5-dimethyl-2-phenylacetamidomethyl-4-carboxy-thiazolidine, otherwise designated as d-penilloic acid G.

Penilloic acid G possesses two asymmetric carbon atoms and should exist in four stereoisomeric optically active forms, two of which are obtained from d-penicillamine and two from l-penicillamine. When d-penilloic acid G is prepared as described above, it is obtained as a mixture of two isomeric forms, which have been arbitrarily designated as d-$\alpha$-penilloic acid G, and d-$\beta$-penilloic acid G, and which are presumed to be the expected diastereoisomers of d-penilloic acid G. The d-$\alpha$-penilloic acid G is characterized by having a higher optical rotation and by crystallizing more readily from solution than the $\beta$-form. Furthermore d-$\alpha$-penilloic acid G is easily converted into crystalline derivatives, such as the phenyl urethane and the hydrochloride.

As ordinarily carried out, the reaction of d-penicillamine hydrochloride with phenylacetamido-acetaldehyde dibutyl acetal produces a mixture d-$\alpha$-penilloic acid G and d-$\beta$-penilloic acid G, containing a preponderant amount of the $\alpha$-isomer. The ratio of the $\alpha$-isomer to the $\beta$-isomer, which can be conveniently estimated by determining the optical rotation of the mixture of isomers, is usually of the order of 2:1. This ratio is, however, dependent on various factors, e. g., the solvent employed in the reaction, the pH range during the reaction, and the equilibrium between the two forms in solution during isolation and purification.

Applicants have found that the mixture of isomers can be readily separated by dissolving the mixture in a hot aqueous solvent, and then allowing the solution to stand at room temperature, whereby substantially all of the d-$\alpha$-penilloic acid G separates in crystalline form, and free of the $\beta$-isomer. The $\beta$-isomer is obtained by cooling the mother liquor to 0 to 5° C., whereupon the d-$\beta$-penilloic acid G crystallizes in substantially pure form.

The following examples illustrate methods of carrying out our novel and improved process, but it is to be understood that these examples are given by way of illustration and not of limitation.

*Example 1*

About 174 mg. of d-penicillamine hydrochloride is dissolved in about 2 cc. of water, and to this solution is added a solution containing about 341 mg. of phenylacetamido-acetaldehyde dibutyl acetal, dissolved in about 2 cc. of ethanol. The resulting mixture is heated for a few minutes on the steam bath and the reaction solution is then cooled to room temperature. About 133 mg. of fused sodium acetate is added to this solution, and the solution is evaporated to dryness, to produce a material which is free of sulfhydryl groups, as may be confirmed by test. About 50 cc. of ethanol is added to the substantially anhydrous reaction product, and the mixture is heated under reflux for approximately one hour. The alcoholic reaction mixture is cooled and allowed to stand at room temperature for approximately 20 hours. The precipitated sodium chloride is removed by filtration, and the filtrate is evaporated to dryness to produce approximately 342 mg. of a glassy solid. This product is obtained as a powder by dissolving in chloroform and precipitating by the addition of petroleum ether to produce a mixture of dextrorotatory stereoisomers of 5,5-dimethyl-2-phenylacetamidomethyl-4-carboxy-thiazolidine, otherwise designated as d-penilloic acid G; $(\alpha)_D^{25}+78°$. Anal. calc'd for $C_{15}H_{20}O_3N_2S \cdot H_2O$: C, 55.19; H, 6.79; N, 8.59. Found: C, 54.43; H, 6.67; N, 8.29.

*Example 2*

A solution containing about 1.87 gms. of d-penicillamine hydrochloride dissolved in about 20 ml. of water is added to a solution containing about 3.1 gms. of phenylacetamido-acetaldehyde dibutyl acetal dissolved in about 20 ml. of ethanol. The resulting solution is heated on a steam cone for a period of about 5–10 minutes. The solution is cooled to about 25° C. and about 0.98 gm. of potassium acetate are added. The solution is allowed to stand overnight at room temperature. The crystalline precipitate of shining needles which separates is recovered by filtration, washed with water-ethanol, and dried at room temperature to produce approximately 1.4 gms. of substantially pure d-$\alpha$-penilloic acid G monohydrate; M. P. 112–114° C. (corr.), (softens at 100–105° C.); $(\alpha)_D^{23}+63.4°$ (ethanol). Anal. calculated for $C_{15}H_{20}O_3N_2S \cdot H_2O$: C, 55.19; H, 6.79; N, 8.59. Found: C, 54.97; H, 6.70; N, 8.30. Equivalent weight: Calc'd: 326.4; found: 327.

When this material is dried at a temperature of about 61° C. for approximately forty-eight hours, the water of hydration is removed to produce substantially anhydrous d-$\alpha$-penilloic acid G; M. P. 87–92° C. (corr.); $(\alpha)_D^{23}+53$ (ethanol). Anal. calc'd for $C_{15}H_{20}O_3N_2S$: C, 58.42; H, 6.54; N, 9.09. Found: C, 58.12; H, 6.58; N, 8.99. Equivalent weight: calc'd: 308.4; found: 307.

The d-$\alpha$-penilloic acid G can be further characterized by reaction with phenyl isocyanate whereby the corresponding phenyl-urethane is produced; M. P. 174° C. (corr.); Anal. calc'd for $C_{22}H_{25}N_3O_4S$: C, 61.80; H, 5.90; N, 9.83. Found: C, 61.95; H, 6.16; N, 9.86.

The d-α-penilloic acid G can be still further characterized as the hydrochloride; M. P. 203–204° C. (corr.). Anal. calc'd for $C_{15}H_{21}O_3N_2SCl$: C, 52.24; H, 6.14; N, 8.13. Found: C, 52.29; H, 6.09; N, 7.97.

Example 3 d-Penicillamine hydrochloride and phenylacetamidoacetaldehyde dibutyl acetal are reacted substantially as described in Example 2, and the crystalline precipitate of d-α-penilloic acid G, which crystallizes from the reaction solution at room temperature, is removed by filtration. The mother liquor is then cooled to approximately 0–5° C. and allowed to stand several hours, whereupon the β-isomer separates as globular masses of crystals, which are recovered by filtration, washed with cold water-ethanol, and dried to produce substantially pure d-β-penilloic acid G; M. P. 158–160° C.; $(α)_D$+26° (ethanol). Anal. calc'd for $C_{15}H_{20}O_3N_2S$: C, 58.42; H, 6.54; N, 9.09; C, 57.95; H, 6.92; N, 9.19.

Modifications may be made in carrying out the present invention without departing from the spirit and scope thereof, and the invention is to be limited only by the appended claims.

We claim:

1. Dextrorotatory stereoisomers of penilloic acid G, having the chemical name 5,5-dimethyl-2-phenylacetamidomethyl-4-carboxy-thiazolidine and the structural formula:

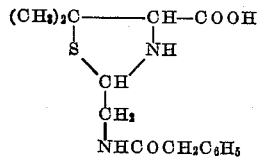

2. d-α-Penilloic acid G, having the chemical name d-α-5,5-dimethyl-2-phenylacetamidomethyl-4-carboxy-thiazolidine, and having, when in substantially pure form a melting point of approximately 112–114° C. and an $[α]_D^{23}$ in ethanol of about 63.4°.

3. d-β-Penilloic acid G, having the chemical name d-β-5,5-dimethyl-2-phenylacetamidomethyl-4-carboxy-thiazolidine, and having, when in substantially pure form a melting point of approximately 158–160° C. and an $[α]_D^{23}$ in ethanol of about 26°.

4. The process of preparing dextrorotatory stereoisomers of 5,5-dimethyl-2-phenylacetamido-methyl-4-carboxy-thiazolidine, having the structural formula:

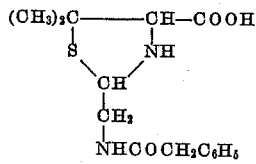

which comprises reacting a compound selected from the group which consists of d-penicillamine having the structural formula:

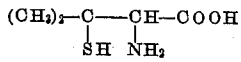

and salts thereof, with a compound selected from the class which consists of phenylacetamido-acetaldehyde and the dibutyl acetal thereof to produce a mixture of said dextrorotatory stereoisomers of 5,5-dimethyl-2-phenylacetamidomethyl-4-carboxy-thiazolidine.

5. The process of preparing dextrorotatory stereoisomers of 5,5-dimethyl-2-phenylacetamido-methyl-4-carboxy-thiazolidine which comprises reacting d-penicillamine hydrochloride with phenylacetamido-acetaldehyde dibutyl acetal, said reaction being carried out by heating the reactants in aqueous solution, to produce a mixture of said dextrorotatory stereoisomers of 5,5-dimethyl-2-phenylacetamido-methyl-4-carboxy-thiazolidine.

6. The process which comprises reacting, in aqueous solution, d-penicillamine hydrochloride and phenylacetamido-acetaldehyde dibutyl acetal, adjusting the pH of the reaction solution to between about pH 3 and about pH 10 by adding an alkali metal acetate thereto, and continuing the reaction to produce a mixture of dextrorotatory stereoisomers of 5,5-dimethyl-2-phenylacetamido-methyl-4-carboxy-thiazolidine.

7. The process of preparing d-α-penilloic acid G, having the chemical name d-α-5,5-dimethyl-2-phenylacetamidomethyl-4-carboxy-thiazolidine, in substantially pure form, which comprises mixing an aqueous solution of d-penicillamine hydrochloride with an alcoholic solution of phenylacetamido-acetaldehyde dibutyl acetal, heating the resulting solution to effect hydrolysis of the acetal linkages, adjusting the pH to approximately 4 by adding sodium acetate to the reaction solution, maintaining the resulting mixture at a temperature of approximately 25° C. to complete the reaction and crystallize d-α-penilloic acid G, and recovering said d-α-penilloic acid G.

8. The process of preparing d-β-penilloic acid G, having the chemical name d-β-5,5-dimethyl-2-phenylacetamidomethyl-4-carboxy-thiazolidine, in substantially pure form, which comprises mixing an aqueous solution of d-penicillamine hydrochloride with an alcoholic solution of phenylacetamido-acetaldehyde dibutyl acetal, heating the resulting solution, to effect hydrolysis of the acetal linkages, adjusting the pH to approximately 4 by adding sodium acetate to the reaction solution, maintaining the resulting mixture at a temperature of approximately 25° C. to complete the reaction and crystallize d-α-penilloic acid G, removing said d-α-penilloic acid G by filtration, maintaining the mother liquor at 0°–5° C. to crystallize d-β-penilloic acid G, and recovering said d-β-penilloic acid G.

ROBERT L. PECK.
OSCAR JOHNSON.

REFERENCES CITED

The following references are of record in the file of this patent:

Merck Reports, Dec. 1943, MVI, page 4 XIIa, page 3 XVa, page 1, XVc, page 1.

Merck Reports MXVC, page 1, March 31, 1944.

Upjohn Reports UV, April 13, 1944, pages 17 and 18.

Experiments on Synthesis of Penicillin by Upjohn Co., June 8 to July 10, 1944, UX pp. 10 and 5.

British Reports on Penicillin, Oct. 30, 1944, Br. 119.